United States Patent [19]

Yamada et al.

[11] Patent Number: 4,919,713

[45] Date of Patent: Apr. 24, 1990

[54] PROCESS FOR PRODUCING CHROMIUM CONTAINING MOLTEN IRON

[75] Inventors: Sumio Yamada; Chikashi Tada; Keizo Taoka; Hajime Bada, all of Chiba, Japan

[73] Assignee: Kawasaki Steel Corp.

[21] Appl. No.: 315,407

[22] Filed: Feb. 23, 1989

[30] Foreign Application Priority Data

Feb. 24, 1988 [JP] Japan .................................. 63-39719

[51] Int. Cl.$^5$ .............................................. C21C 7/00
[52] U.S. Cl. ........................................ 75/532; 75/540
[58] Field of Search ..................... 75/51.5, 59.22, 49

[56] References Cited

U.S. PATENT DOCUMENTS

| | | | |
|---|---|---|---|
| 3,854,932 | 12/1974 | Bishop | 75/49 |
| 4,178,173 | 12/1979 | Gorges | 75/59.22 |
| 4,410,359 | 10/1983 | Bishop | 75/59.22 |
| 4,474,605 | 10/1984 | Masuda | 75/59.22 |

*Primary Examiner*—Peter D. Rosenberg
*Attorney, Agent, or Firm*—Austin R. Miller

[57] ABSTRACT

A process of production of chromium containing molten iron generally comprises two steps. In a first step, top and bottom-blown reduction for reducing chromium is performed with charging carbon containing material and slag forming agent from the top of a converter for melting stainless scrap and for rising temperature of molten iron bath. In a second step which is performed subsequently to the first step, top and bottom-blown injection with charging chromium oxide and carbon from the top of the converter for reduction of chromium.

17 Claims, 5 Drawing Sheets

PROCESS FOR PRODUCING CHROMIUM CONTAINING MOLTEN IRON

BACKGROUND OF THE INVENTION

1. Field of the Invention

The present invention relates generally to a process for producing a chromium containing molten iron which is suitable for use in production of stainless steel. More specifically, the invention relates to a process for producing a chromium containing molten iron from inexpensive material, such as stainless scrap and chromium (CR) ore or chromium containing oxide.

2. Description of the Background Art

It is generally and conventionally implemented technology for producing molten stainless mother melt, i.e. chromium containing molten iron for production of stainless steel, utilizing top-blown or top and bottom-blown converters for example. In production of such chromium containing molten iron, ferrochromium alloy, such as HCFeCR, has been used as source of chromium. The ferrochromium alloys are relatively expensive materials and cause high cost in production of the chromium containing molten iron. In view of the production cost, it is advantageous to use more inexpensive chromium oxide containing material, such as stainless scrap, chromium ore, semi-reduced chromium ore or pellets and so forth. In the conventional technologies, such replacement could not be realized because of low melting reduction efficiency.

In implementing production of chromium containing molten iron, the following problems have been left unsolved.

First of all, when stainless scrap is used as a source of chromium, heat absorption and lowering of carbon (C) concentration occurs to cause lowering of reduction efficiency of Cr oxide. Secondly, even when the amounts of carbon and oxygen are adjusted so as to establish heat balance in view of heat absorption, the reduction speed of Cr oxide is relatively low to cause expansion of the process period resulting in excessively high temperature of the molten iron. Excessively high temperature of molten iron causes acceleration of melting of the refractory.

SUMMARY OF THE INVENTION

Therefore, it is an object of the present invention to make it possible to implement production of chromium containing molten metal utilizing chromium containing oxide and stainless scrap as replacements for expensive ferrochromium alloys.

In order to accomplish the aforementioned and other objects, a process of production of chromium containing molten iron, according to the present invention, generally comprises two steps. In a first step, top and bottom-blow injection is performed while charging a carbon containing material and a slag forming agent from the top of a converter for melting stainless scrap and for increasing the temperature of the molten iron bath. In a second step which is performed subsequently to the first step, top and bottom-blow injection is performed while charging chromium oxide and carbon from the top of the converter for reduction of chromium.

According to one aspect of the invention, a process for producing chromium containing molten iron, comprises the steps of:

charging a stainless steel scrap and molten pig iron into a top and bottom-blown converter for forming molten iron bath;

performing a scrap melting and heating stage operation in which top blowing of oxygen with charging carbon containing material and a slag forming agent through the top of the converter is performed for melting the stainless steel scrap and heating the molten iron bath to a predetermined temperature; and performing a reduction stage operation subsequent to the scrap melting and heating stage operation, in which top blowing of oxygen while charging carbon containing material and chromium oxide through the top of the converter is performed for reducing chromium and thus forming a chromium containing molten iron.

The scrap melting and heating stage operation may be performed for heating the molten iron bath at a temperature higher than or equal to 1500° C. and/or to establish a relationship between carbon concentration [C] and chromium concentration [Cr] satisfying the following formula:

$$[C] \geqq 4.03 + 0.84 \times [Cr]$$

The scrap melting and heating stage may be separated into two series steps, in which a first scrap melting step is performed in advance of a second heating step, for melting the scrap, and in which the second heating step is performed subsequent to the first scrap melting step for increasing the temperature of the molten iron bath to a temperature higher than or equal to 1500° C. and adjusting the carbon concentration [C] versus the chromium concentration [Cr] to satisfy the following formula:

$$[C] \geqq 4.03 + 0.84 \times [Cr]$$

The process may further comprise the step of monitoring the condition of the molten iron bath and determining the timing for transition between the first scrap melting step and the heating step on the basis of the monitored condition. In such case, the molten iron bath condition monitoring step may be performed by monitoring variation of molten iron temperature for detecting the transition timing when the variation rate of the molten iron temperature becomes constant. Alternatively, the stainless steel scrap may be selected to contain a known concentration of nickel and the molten iron bath condition monitoring step may performed by monitoring nickel concentration in the molten iron for detecting the transition timing when the monitored nickel concentration reaches a predetermined value which is arithmetically derived on the basis of the known concentration of nickel in the stainless steel scrap, the initial concentration of nickel in the molten pig iron and the amount of the stainless steel scrap charged in the converter.

Furthermore, it is preferable that the reduction stage includes the step of finishing reduction for promoting reduction by stirring the molten iron bath.

Another aspect of the invention, in a process for reducing chromium containing molten iron, comprises the steps of:

charging stainless steel scrap and molten pig iron into a top and bottom-blown converter for forming a molten iron bath; and performing top and bottom blowing while charging a carbon containing material and chromium oxide through the top of the converter for reducing chromium and thus forming chromium containing molten iron, the improvement characterized by the step of separating the top and bottom blowing process into a first stage for melting the stainless steel scrap and conditioning the molten iron bath for a preparation for subsequent reduction stage, and a second stage for reducing chromium, the second stage being performed after establishing a predetermined condition of the molten iron bath for reduction process.

BRIEF DESCRIPTION OF THE DRAWINGS

The present invention will be understood more fully from the detailed description given herebelow and from the accompanying drawings which illustrate results of experiments, which, however, should not be taken to limit the invention but are for explanation and understanding only.

In the drawings.

DETAILED DESCRIPTION OF THE INVENTION

The present invention will now be described in detail with reference to the accompanying drawings. Basically, the reduction process for reducing Cr is performed through two mutually different steps. In a first step, top and bottom-blown injection is performed while charging carbon containing material and slag forming agent from the top of a converter for melting stainless scrap and for increasing the temperature of the molten iron bath. In a second step which is performed subsequently to the first step, top and bottom-blow injection is performed while charging chromium oxide and carbon from the top of the converter for reduction of chromium.

At the beginning of the second step, the temperature of the molten iron bath is adjusted to be higher than or equal to 1500° C. At the beginning of reduction, the C concentration in the molten iron bath is adjusted to satisfy the following formula:

$$[C] \geq 4.03 + 0.084 \times [Cr]$$

As will be seen from FIG. 1(a), the preferred process according to the present invention is separated into two steps as set forth above. Before starting the first step, stainless scrap and molten pig iron are charged into a top and bottom-blown converter. The first step is further separated into two sub-steps. A sub-step to be performed earlier than the other sub-step will be hereafter referred to as "scrap melting step" and the other and later sub-step will be hereafter referred to as a "heating step". Both the scrap melting step and the heating step are performed to inject oxygen to the molten iron bath from the top of the converter and to inject inert gas, such as Ar gas, from the bottom of the converter. During this first step, carbon containing material such as coke and the slag forming agent are charged continuously through the top of the converter. Through this first step, the stainless scrap is melted and the C concentration and temperature of the molten iron bath reaches the condition satisfying the condition set forth above.

The first step is terminated after the stainless scrap is melted and the concentration in the molten iron satisfies the foregoing formula and the temperature of the molten iron bath becomes higher than or equal to 1500° C. Subsequently to the first step, the process in the second step is performed for reducing Cr oxide. In this process, top and bottom blowing is performed in order to maintain the condition of the molten iron bath established through the first step as long as possible. During the process in the second step, Cr oxide and carbon containing material are charged continuously through the top of the converter.

Figure 1:
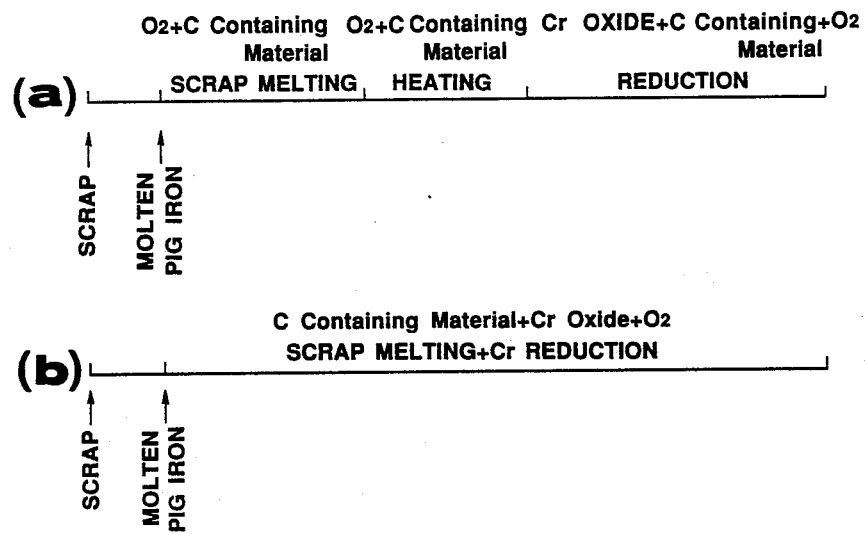
FIGS. 1 (a) and 1 (b) are charts respectively showing reduction process patterns in the prior art and the invention.

The preferred process according to the present invention as set out with respect to FIG. 1 (a) may be compared with the conventional process as illustrated in FIG. 1 (b). As will be seen from FIG. 1 (b), in the conventionally proposed process, carbon containing material and Cr oxide are charged continuously from the beginning of the reduction process. In this process chemical reaction between carbon and oxygen occurs according to the following formula.

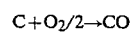

$$C + O_2/2 \rightarrow CO$$

The heat created by the foregoing chemical reaction is consumed for melting the stainless scrap. As well, the heat is consumed as sensible heat for decomposition of Cr oxide. Therefore, it requires a longer period for melting the stainless scrap. Furthermore, the rate of increase of the molten iron bath temperature is relatively low because the process has no heating period. Therefore, it takes a long period of time to increase the molten iron bath temperature to a temperature high enough to perform a reducing operation. Temperature variation of the molten iron bath in the conventionally proposed process is shown by a broken line in FIG. 2. This can be compared with the temperatur variation of the molten iron bath in the present invention, which is illustrated by the solid line in FIG. 2. As will be clear from the FIG. 2, when the overall process period for performing the Cr oxide reducing operation is set at equal period, the preferred process according to the present invention will have much longer effective period for reduction in comparison with that in the prior proposed process.

As will be naturally appreciated, a shorter effective period for reduction will provide a smaller reduction amount which results in lesser heat absorption to cause an increase of temperature in the molten iron bath to increase the possibility of damaging the refractory.

Returning to the preferred process according to the present invention, the end of the scrap melting step can be detected or assumed by monitoring the temperature increase coefficient k and detecting the time when the temperature increase coefficient becomes constant. In the alternative, as regards stainless scrap, a Ni containing stainless scrap can be used with a known Ni concentration. In such case, the end of the scrap melting step can be detected by monitoring the variation of Ni concentration in the molten iron.

When the end of the scrap melting step is detected by monitoring the temperature increase coefficient k, the temperature increase coefficient of the molten iron bath can be derived from the following equation.

Here, it is assumed that the temperature of the molten iron bath by means of a sub lance or by tilting the converter after blowing of oxygen in amount of $x_1 Nm^3$, is $T_1$ (°C.), and the temperature of the molten iron bath after blowing of oxygen in an amount of $x_2 Nm^3$ is $T_2$ (°C.).

$$k = \{t \times (W_{HM} + W_{SC})\}/(x_2 - x_1)$$

where
$W_{HM}$ is weight of molten pig iron (tons);
$W_{SC}$ is weight of stainless scrap (tons);
t is a temperature difference between $T_1$ and $T_2$; $(T_2 - T_1)$.

Figure 3:
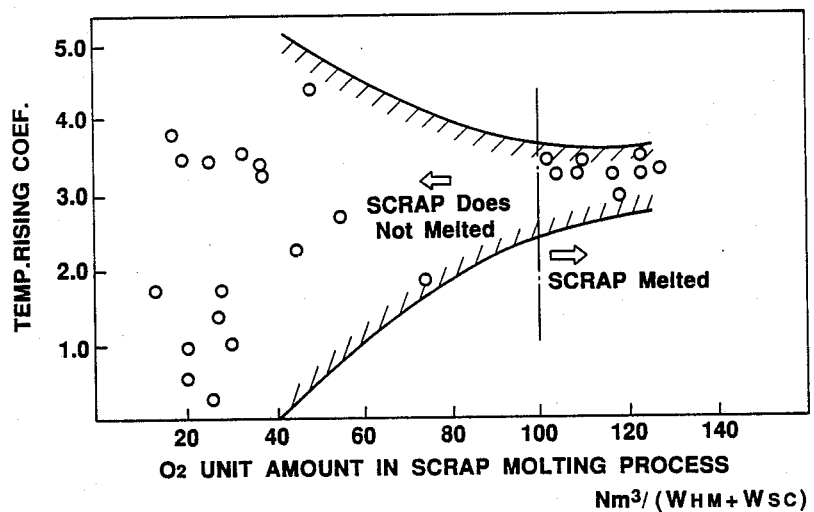
FIG. 3 is a graph showing a relationship between amount of oxygen consumed during a step of melting stainless scrap and the temperature increase coefficient.

From the above, the temperature increase coefficient at the oxygen blowing amount $x_2 Nm^3$. In the same manner, oxygen blowing unit amount and the temperature increase coefficient k at the oxygen blowing unit amount were derived with respect to an 85 ton top and bottom-blown converter. The result is shown in FIG. 3. In the rxperiment performed by utilizing an 85 ton top and bottom-blown converter (molten pig iron 35 tons to 45 tons, and stainless scrap 20 tons to 25 tons). The temperature increase coefficient k becomes stable and constant as the oxygen blowing unit amount reaches 100 $Nm^3$/ton. This represents that the stainless scrap is melted. As will be appreciated, through the foregoing process, it becomes possible to accurately determine the timing of the end of the scrap melting step.

Since the temperature increase coefficient k is the ratio of increase of the temperature of the molten iron bath in relation to the oxygen blowing speed, it tends to fluctuate depending on the charge at the top of the converter but can be regarded as substantially constant. Therefore, when the temperature increase coefficient fluctuates at significant level, it indicates that heat created by reaction between carbon and oxygen is consumed for melting the stainless scrap.

Here, further discussion will be provided for making the physical meaning of the temperature increase coefficient k more clear.

Assuming a carbon containing material is supplied to an 85 ton top and bottom-blown converter in an amount of 18 kg/$Nm^3$ $O_2$, and the secondary combustion ratio is 20%, temperature increase at 1 $Nm^3$ of oxygen can be calculated from the following equations:

Input Heat $$C(12 \text{ kg}) + O_2 (11.2Nm^3)/2 \rightarrow Co(22.4Nm^3)$$

$$\Delta H = -2450 \text{ (kcal/kgC)}$$

In the reaction described by the foregoing equations, since the secondary combustion ratio is assumed as 20%, the oxygen amount used in the primary combustion with respect to a blowing oxygen amount of 1 $Nm^3$ becomes 0.8 $Nm^3$. From this, the following formula can be established:

$$C \rightarrow CO \ 12 \times 0.8/11.2 \times 245 \text{ (kcal/kgC)} = 2100 \text{ (kcal/}Nm^3 \ O_2)$$

On the other hand, since the secondary combustion ratio is assumed as 20%, the oxygen amount consumed for the following reaction:

$$CO + O_2/2 \rightarrow CO_2 \Delta H = -3020 \text{ (kcal/}Nm^3 \ CO)$$

will be 0.4 $Nm^3$ with respect to oxygen blowing amount 1 $Nm^3$.

Here, assuming the heating efficiency in the molten iron bath by the heat generated through the reaction set forth above is 60%, the heat value to be used for the ratio of heat versus the supplied oxygen amount can be illustrated by:

$$CO \rightarrow CO_2 0.4(Nm^3/CO) \times 3020(\text{kcal/kg}.Nm^3CO) \times 0.60 = 724.8(\text{kcal}/Nm^3O_2)$$

Therefore, the total input heat becomes 2828.8 kcal/N-$m^3O_2$.

Output Heat

Assuming the secondary combustion ratio of CO is 80%, the amount to be produced by 1 $Nm^3$ of oxygen becomes 1.6 $Nm^3$. Therefore, the heat to be consumed for secondary combustion of CO can be described by:

$$1.6 \times 489(\text{kcal}/Nm^3CO: \text{heat capacity of CO gas})$$
$$= 782(\text{kcal}/Nm^3O_2)$$

Since the amount of $CO_2$ produced by 1 $Nm^3$ of oxygen is 0.4 $Nm^3$, the heat consumed for generating $CO_2$ can be calculated from the formula set out below:

$$0.4 \times 838(\text{kcal}/Nm^3CO_2) = 335.2(\text{kcal}/Nm^3O_2)$$

The carbon containing material other than that consumed for combustion with oxygen will serve to absorb heat as sensible heat and fusion heat. Since carbon containing material is supplied in the amount of 1.8 kg per 1 $Nm^3$ of oxygen, the heat to be consumed by presence of the carbon containing material can be calculated by:

$$\{1.8 \ (\text{kg}/Nm^3O_2 \times 0.86 \ (\text{C content (\%) in coke}) -$$
$$12 \times 0.8/11.2 \ (\text{amount of C to react with } O_2)\} \times$$
$$342 \ (\text{kcal/kg C}) = 236.3 \ (\text{kcal}/Nm^3O_2)$$

In order to maintain basicity of the slag, a slag forming agent is charged. The slag forming agent consumes heat as sensible heat. In the shown example, lime and coke ash are used as slag forming agent. The heat consumed by the slag forming agent can be derived by:

Lime: $0.225(\text{KgCaO}/Nm^3O_2 33 \ 352(\text{kcal/kgCaO})$
$= 79.2(\text{kcal}/Nm^3O_2)$ Coke Ash: 1.8(kcal/kg)×0.12 (ash ratio (%) in coke)

×400(kcal/kg ash)=86.4(kcal/$Nm^3O_2$)

Pr decomposition heat is also consumed which can be derived from:

12199(kcal/$Nm^3Pr$)×0.013($Nm^3Pr/Nm^3O_2$)=158.6(kcal/$Nm^3O_2$)

The heat is also consumed as sensible heat of molten iron. Increase of temperature t°C. of the molten iron per 1 $Nm^3$ of oxygen can be described by:

$t$(°C.)×0.21(kcal/kg°C.: specific heat)
×($HM+SC$)(ton)×$10^3$(kcal/$Nm^3O_2$)

The heat is further consumed by radiation through the refractory wall. In case of an 85 ton top and bottom-blown converter, the heat consumed by radiation per 1 $Nm^3$ of oxygen is 376 (kcal/$Nm^3O_2$). Heat is also consumed for melting the stainless scrap. The heat consumed for melting the stainless scrap is A (kcal/$Nm_3O_2$). Therefore, the total heat to be consumed can be obtained from:

2054.1+$t$(°C.)×210×(HM+SC)+A (kcal/$Nm^3O_2$)

From the above formula:

(2824.8−2054.1)/210−$A'$(A/210) =$t$×($HM+SC$)

Therefore, k can be obtained from:

$k=t$×($HM+SC$)=3.67−$A'$( °C./$O_2Nm^3$/ton)

In the data derived from the experiment, in which the weight of the molten pig iron was 40 tons and the weight of the stainless scrap was 23 tons, the temperature increase coefficient k at the end of the scrap melting step was approximately 3.5.

Figure 4:
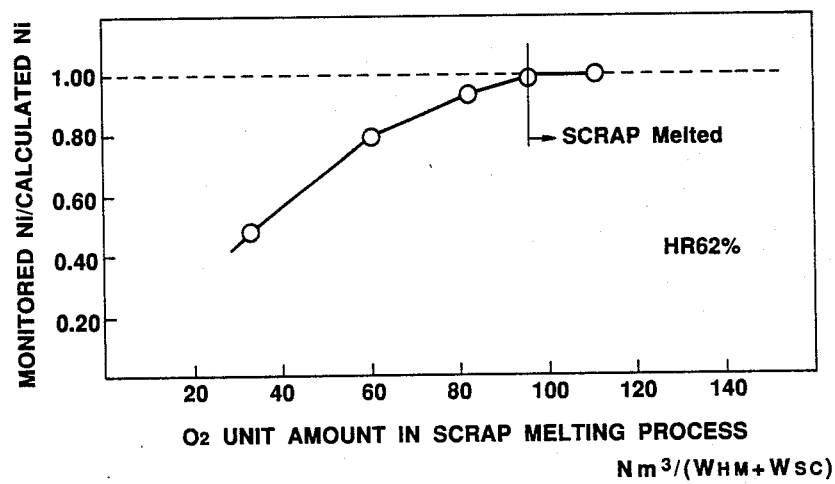
FIG. 4 is a graph showing a relationship between the amount of oxygen consumed during the step of melting stainless scrap and the ratio of actual Ni concentration in the molten iron bath versus an arithmetically derived Ni concentration.

The end of the scrap melting step can be determined on the basis of variation of the Ni concentration in the molten iron, by utilizing scrap containing a known concentration of Ni. In this case, because the Ni concentration is known and the weight of the scrap charged in the molten iron bath is known, the final Ni concentration in the molten iron can be arithmetically derived on the basis of the known Ni concentration in the scrap and the weight of the Ni containing scrap. Therefore, by comparing the arithmetically obtained Ni concentration in the molten iron with the actually measured Ni concentration in the molten iron, the end of the scrap melting step can be detected. Namely, at the end of the scrap melting process where all of the charged scrap is melted, the Ni concentration becomes equal to the arithmetically obtained value. Variation of the Ni concentration according to increase of the melting ratio of the scrap is shown in FIG. 4.

Figure 5:
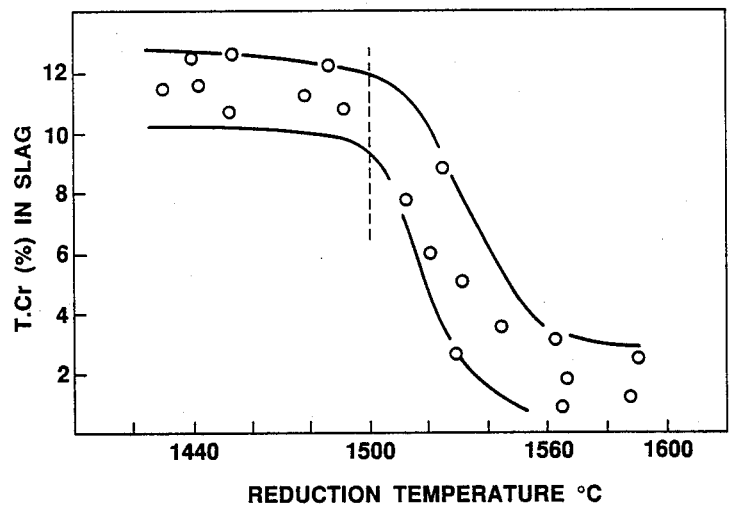
FIG. 5 is a graph showing a relationship between temperature in the step of melting reduction and the total chromium amount (T.Cr) in a slag.

Generally, reduction efficiency is increased according to increase of the temperature to perform the reducing reaction. In order to check the optimum reduction tempertature, experiments were performed at various reduction temperatures utilizing an 85 ton top and bottom-blown converter. The result of these experiments is shown in FIG. 5. As can be seen from FIG. 5, if reduction is performed at a temperature lower than 1500° C., the reducing cannot be promoted and T.CR in the slag cannot be reduced. Therefore, in view of the yield of CR reduction, the temperature for performing the reduction should be higher than or equal to 1500° C.

Figure 6:
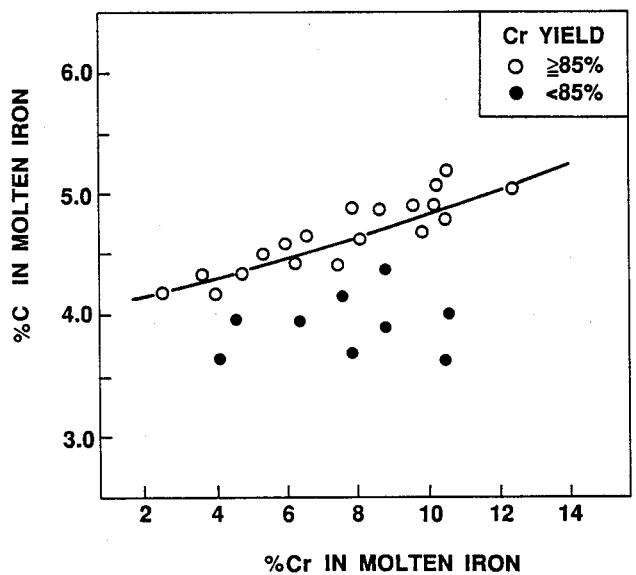
FIG. 6 is a graph showing the influence of C and Cr concentration in molten iron upon Cr reduction yield.

On the other hand, it was found that when C was saturated in the molten iron and C was also contained in the slag, the reduction speed becomes higher. For providing this, a check was performed with respect to tapping Cr% and tapping iron % in relation to the amount of C. The result is shown in FIG. 6. As will be seen from FIG. 6, the Cr reduction yield was held low when the balance of tapping Cr and C was not established and thus the following formula cannot be satisified.

[%C]≧4.03+0.084×[%Cr]

Check was performed with respect to the following four cases:
where the foregoing formula is not satisfied;
where the foregoing formula is satisfied;
where the reduction temperature is higher than or equal to 1500° C.; and
where the reduction temperature is lower than 1500° C.

Figure 7:
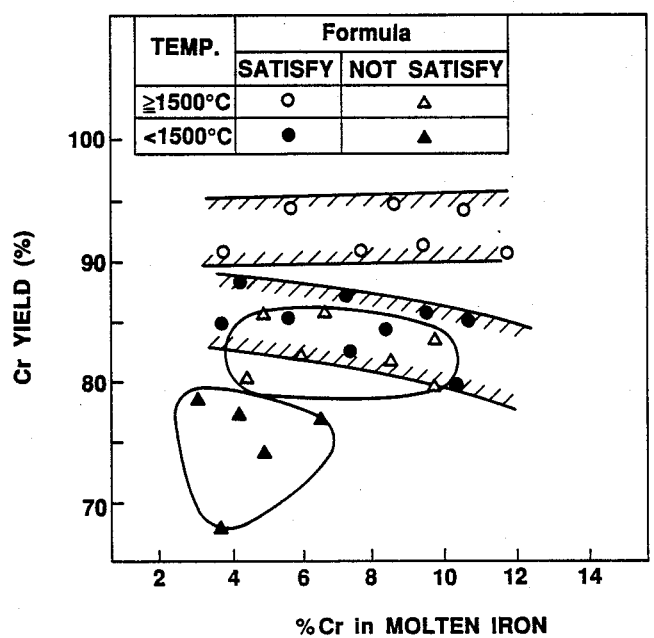
FIG. 7 is a graph showing the influence of the blowing condition upon Cr reduction yield.

The result is shown in FIG. 7. As will be clear from FIG. 7, when the foregoing formula is satisfied and the reduction temperature is higher than or equal to 1500° C., a particularly high Cr reduction yield can be obtained.

For optimization of the Cr reduction process, it is desirable to adjust the condition of the molten iron bath to satisfy the foregoing optimum condition, i.e. concentration satisfying the foregoing formula and the molten iron bath temperature being higher than or equal to 1500° C. Therefore, in the preferred process according to the present invention, the heating step is provided between the scrap melting step and the second step in which Cr reduction is performed.

Figure 8:
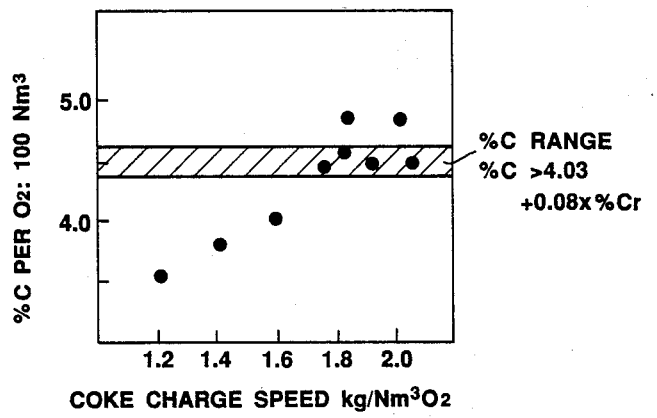
FIG. 8 is a graph showing the relationship between coke charge speed and C concentration in the molten iron.

In the heating step, the charged amount of carbon containing material, e.g. coke, should be determined in order to satisfy the foregoing equation. In order to check variation of the C content at the end of the scrap melting step, the charge speed of coke varied during the scrap melting process. Variation of C (%) in the molten iron in relation to the charge speed of coke is shown in FIG. 8. FIG. 8 shows the result of %C-analysis with respect to molten iron after the scrap melting process which was performed in an 85 ton top and bottom-blown converter containing 23 tons of stainless scrap and 41 tons of molten pig iron and after blowing of oxygen in an amount of 100 $Nm^3$/ton. As seen from FIG. 8, it should be appreciated that when the charge speed of coke is adjusted at 1.8 kg/$Nm^3O_2$ during scrap melting process, the foregoing formula can be satisfied in an 85 ton top and bottom-blown converter. Nevertheless, it is necessary to determine the charge amount of coke as the carbon containing material in view of the charged amount of stainless scrap, the amount of molten pig iron and the Cr% in the scrap. Furthermore, it should be noted that during the Cr reduction process, it is necessary to adjust the coke charge amount for maintaining the molten iron bath condition to satisfy the foregoing formula.

EXAMPLE

Experiments were performed utilizing 85 ton top and bottom-blown converter.

EXAMPLE 1

For the converter, stainless steel scrap in amount of 22.9 tons was charged by means of scrap shoot. After charging the stainless steel scrap, dephosphorized molten pig iron in amount of 41.3 tons was charged. Immediately after charging the molten pig iron, the converter is set at the vertical position and blowing was performed. Composition of the stainless steel scrap and amount of scraps are shown in the following table I.

TABLE I

| | C | Si | P | S | Cr | Ni | Weight (ton) | Total Weight (ton) |
|---|---|---|---|---|---|---|---|---|
| SUS304 Heavy Scrap | 0.07 | 0.45 | 0.040 | 0.010 | 18.15 | 8.50 | 6.4 | 22.9 |
| SUS304 Light Scrap | 0.07 | 0.45 | 0.040 | 0.010 | 18.15 | 8.50 | 16.5 | |

On the other hand, the composition of dephosphorized molten pig iron is shown in the following table II.

TABLE II

| Temp. °C. | C | Si | Mn | P | S | Cr | Ni |
|---|---|---|---|---|---|---|---|
| 1170 | 4.41 | tr | 0.03 | 0.010 | 0.024 | — | — |

After blowing oxygen in amount of 5500 $Nm^3$, sub lance was inserted into the molten iron bath for measuring the temperature thereof. The temperature was 1525° C. In the scrap melting process and before measuring the temperature of the molten iron bath, 280 kg of lime was charged for compensating basicity for Si contained in the scrap. At the blowing of oxygen in amount of 5500 $Nm^3$, the temperature rising coefficient k can be obtained from the following condition:

| | |
|---|---|
| molten pig iron temperature | 1170° C. |
| measured molten iron temperature | 1525° C. |
| amount of molten pig iron | 41.3 tons |
| amount of scrap | 22.9 tons |
| $k = \{(1525 - 1170)/5500\} \times (41.3 + 22.9) = 4.14$ | |

The molten iron temperature was again measured after blowing oxygen in amount of 6200 $Nm^3$. The measured molten iron temperature was 1565° C. From this, the temperature rising coefficient k is derived from:

$$k = \{(1565-1525)/(6200-5500)\} \times (41.4+22.9) = 3.67$$

In view of FIG. 3, judgement could be made that the scrap was melted at this time.

In the shown experiment, a target temperature for performing Cr reducing process was set at 1575° C. Therefore, in the heating step, temperature rising of 10° was required. For risiing the molten iron temperature for 5° C., the required oxygen amount to blow can be derived from:

$$\{(1575-1565)/3.67\} \times (41.3+22.9) = 175 Nm^3 O_2$$

Therefore, after blowing 180 $Nm^3$ of oxygen in the heating step, process moves to the second Cr reduction step.

Through the scrap melting step and the heating step, the carbon containing material, i.e. coke was charged in a ratio of 1.8 kg/$Nm^3O_2$. The process time from the beginning of the process to the beginning of the Cr reduction process was 28.6 min.

Here, %Cr of scrap and charged weight of scrap, %Cr in the molten iron bath can be derived by:

$$\{(6.4+16.5) \times 0.1815/(22.9+41.4)\} \times 100 = 6.47\%$$

From this, it is appreciated that %C has to be grater than or equal to 4.57. After blowing 6200 $Nm^3$ of oxygen, %C derived from the analysis of measured data by means of the sub lance was 4.60 which satisfies the formula of:

$$[\%C] \geq 4.03 + 0.084 \times [\%Cr]$$

In the reduction process, in order to maintain the molten iron bath temperature constant and in order to maintain heat balance, semi-reduced Cr pellet of 2.4 kg/$Nm^3$ $O_2$ and carbon containing material of 1.3 kg $Nm^3$ $O_2$ were charged. The composition of the semi-reduced CR pellet is shown in the following table III.

TABLE III

| | | | | | (wt %) |
|---|---|---|---|---|---|
| T.Cr | SolCr | T.Fe | SolFe | Reduction Ratio | $SiO_2$ |
| 32.18 | 19.68 | 22.23 | 20.06 | 69.89 | 4.72 |
| $Al_2O_3$ | CaO | MgO | P | S | |
| 17.28 | 0.45 | 10.29 | 0.024 | 0.128 | |

After completing charging of semi-reduced CR pellet set forth above and after blowing oxygen in amount of 18000 $Nm^3$, process moves to a finishing reduction stage. In the finishing reduction stage, oxygen blowing speed is reduced to perform top-blow in a ratio of 60 $Nm^3$/min, and to perform bottom-blow in a ratio of 60 $Nm^3$/min. After 10 min of fining reduction process, the resultant molten iron was tapped. The overall process period was 69.95 min.

Immediately before entering into finishing reduction process, the temperature of molten iron bath was measured by means of sub lance. The measured temperature was 1570° C. The process that the temperature of the molten iron bath was maintained substantially in constant.

Molten iron bath temperature and composition of tapped molten iron is shown in the following table IV.

TABLE IV

| Temp °C. | C | Si | Mn | P | S | Cr | Ni |
|---|---|---|---|---|---|---|---|
| 1554 | 6.06 | — | 0.39 | 0.032 | 0.009 | 2.73 | |

On the other hand, the composition of the slag at tapping is shown in the following table V.

TABLE V

| T.Fe | T.C | $SiO_2$ | MnO | $P_2O_5$ | S | $Al_2O_3$ | CaO | MgO | T.Cr |
|---|---|---|---|---|---|---|---|---|---|
| 0.7 | 2.31 | 14.7 | 0.1 | 0.01 | 0.569 | 23.71 | 37.5 | 16.34 | 0.6 |

The charge charged in the converter is shown in the following table VI.

TABLE VI

| Pig Iron | Scrap | Cr Pellet | Coke | Lime | Dolomide | O2 | Pr | N2 |
| --- | --- | --- | --- | --- | --- | --- | --- | --- |
| 41.3 t | 22.9 t | 23.35 t | 29.02 t | 5.74 t | 2.28 t | 19575 | 245 | 1764 |

In the experiment set out above, Cr reduction yield was 95.21%, molten iron production yield was 92.72% and Ni reduction yield was 100%.

EXAMPLE 2

Figure 9:
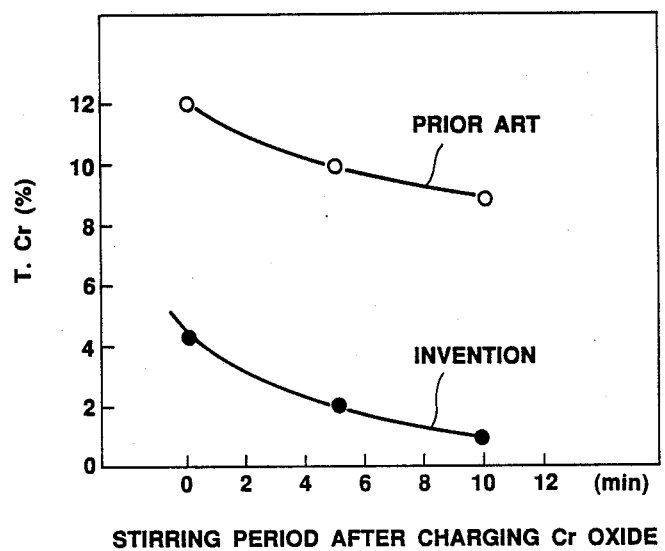
FIG. 9 is a graph showing the relationship between stirring period after charging Cr oxide and the T.Cr in the slag.
Figure 1:
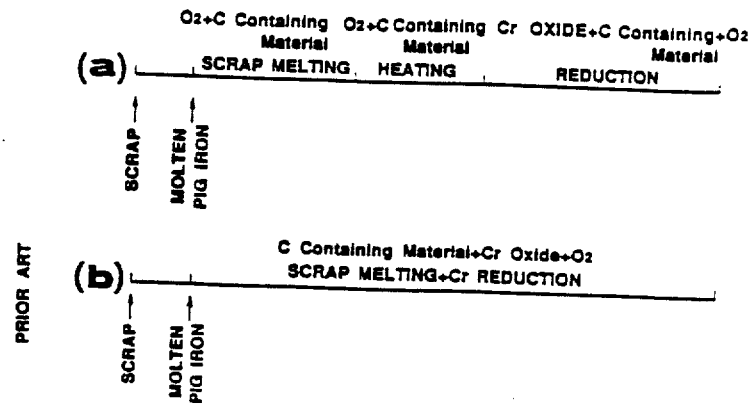
Figure 2:
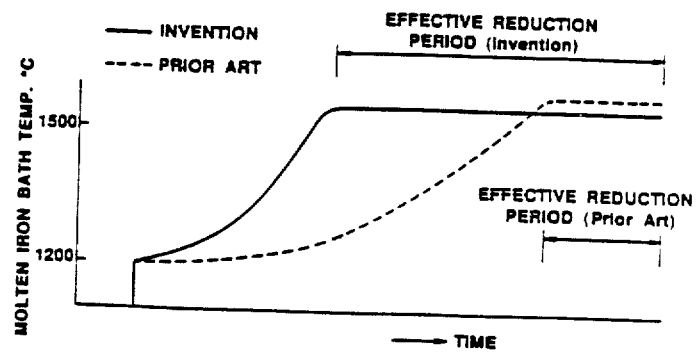

Another experiments were performed for checking efficiencies of production of chromium containing molten iron when the finishing reduction stage is performed and not performed. In addition, conventional process with final reduction process and without finishing reduction process were performed in order to obtain comparative data. The result is shown in the following table VII. Additionally, relationship between stirring time (finishing reduction) and T.Cr amount in the slag is shown in FIG. 9.

TABLE VII

|  | Example 1 | Example 2 | Comp. 1 | Comp. 2 |
| --- | --- | --- | --- | --- |
| Pig Iron (t) | 41.3 | 40.7 | 38.7 | 39.7 |
| Scrap (t) | 23.4 | 22.9 | 23.0 | 23.0 |
| Cr Pellet (t) | 26.78 | 21.95 | 25.84 | 24.54 |
| Coke (t) | 29.74 | 27.42 | 26.19 | 26.60 |
| Oxygen ($Nm^3$) | 21120 | 19440 | 21707 | 21087 |
| Lime (t) | 6.25 | 5.39 | 6.46 | 5.99 |
| Dolomide t | 2.34 | 2.31 | 2.15 | 2.14 |
| Tap C (%) | 5.46 | 5.57 | 5.54 | 5.21 |
| Tap Cr (%) | 16.43 | 15.26 | 14.90 | 14.77 |
| Tap Temp. (oC) | 1557 | 1562 | 1565 | 1576 |
| Cr Yield (%) | 93.5 | 96.0 | 80.4 | 84.2 |
| Iron Production Yield (%) | 92.3 | 93.5 | 88.9 | 90.5 |
| Tapping Amount (t) | 73.2 | 70.6 | 67.4 | 68.8 |
| Blowing Time (min) | 72 | 69 | 74 | 78 |
| Finishing Reduction (min) | — | 10 | — | 10 |
| Scrap Melting Step (min) | 26.9 | 26.9 | — | — |
| Reduction Step (min) | 45.1 | 32.1 | — | — |

In the foregoing table VII, Example 1 is the result obtained from the preferred process but without performing finishing reduction, Example 2 is the result obtained from the preferred process with the finishing reduction, comp. 1 is comparative example performed according to the conventional process and without performing finishing reduction, and comp. 2 is comparative example performed according to the conventional process with finishing reduction.

As will be appreciated herefrom, the present invention enables to perform production of the chromium containing molten iron with the converter with satisfactorily high yield. Furthermore, according to the present invention, damage on the refractory wall of the converter can be minimized.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A process for producing chromium containing molten iron, wherein
    a chromium containing iron scrap and molten pig iron are charged into a top and bottom-blown converter for forming a molten iron bath the separate steps (a) and (b) which comprise:
    (a) performing a scrap melting and heating step comprising top and bottom blowing of oxygen while charging a carbon containing material and a slag forming agent through the top of said converter for melting said chromium containing iron scrap and heating ssaid molten iron bath to a predetermined temperature; and
    (b) performing a reduction step subsequent to said scrap melting and heating step, said reduction step comprising top and bottom blowing of oxygen while charging carbon containing material and chromium oxide through the top of said converter for reducing chromium and thus forming a chromium containing molten iron.

2. A process as set forth in claim 1, wherein said scrap melting and heating stage operation is performed for heating said molten iron bath at a temperature higher than or equal to 1500° C.

3. A process as set forth in claim 1, wherein said scrap melting and heating stage operation is performed to establish a relationship between carbon concentration [C] and chromium concentration [Cr] satisfying the following formula:

$$[C] \geq 4.03 + 0.84 \times [Cr]$$

4. A process as set forth in claim 3, wherein said scrap melting and heating stage operation is performed to establish a relationship between carbon concentration [C] and chromium concentration [Cr] satisfying the following formula:

$$[C] \geq 4.03 + 0.84 \times [Cr]$$

5. A process as set forth in claim 1, wherein said scrap melting and heating stage is separated into two series steps, in which a first scrap melting step is performed in advance of a second heating step, for melting said scrap and said second heating step is performed subsequent to said first scrap melting step for rising the temperature of said molten iron bath to a temperature higher than or equal to 1500° C. and adjusting carbon concentration [C] versus chromium concentration [Cr] to satisfy the following formula:

$$[C] \geq 4.03 + 0.84 \times [Cr]$$

6. A process as set forth in claim 5, which further comprises a step of monitoring a condition of molten iron bath and detecting a timing for transition between said first scrap melting step and said heating step on the basis of the monitored condition.

7. A process as set forth in claim 6, wherein said molten iron bath condition monitoring step is performed by monitoring variation of molten iron temperature for detecting said transition timing when variation rate of said molten iron temperature becomes constant.

8. A process as set forth in claim 6, wherein said chromium containing iron scrap is selected to contain a known concentration of nickel and said molten iron bath condition monitoring step is performed by monitoring nickel concentration in said molten iron for detecting said transition timing when the monitored nickel concentration reaches a predetermined value which is arithmetically derived on the basis of said known concentration of nickel in said chromium containing iron scrap, initial concentration of nickel in said molten pig iron and amount of said chromium containing iron scrap charged in said converter.

9. A process as set forth in claim 1, wherein said reduction stage includes a step for finishing reduction for promoting reduction by stirring the molten iron bath.

10. In a process for reducing chromium containing molten iron, comprising the steps of:
 charging a chromium containing iron scrap and molten pig iron to a top and bottom-blown converter for forming molten iron bath; and
 performing top and bottom blowing with charging carbon containing material and chromium oxide through the top of said converter is performed for reducing chromium and thus forming chromium containing molten iron,
 where the improvement characterized by separating the top and bottom blowing process into a first stage for melting said chromium containing iron scrap and conditioning said molten iron bath for preparation for subsequent reduction stage, and a second stage for reducing chromium, said second stage being performed after a predetermined condition of said molten iron bath for reduction process.

11. A process as set forth in claim 10, wherein said predetermined condition includes a temperature of the molten iron in said molten iron bath which is to be higher than or equal to 1500° C.

12. A process as set forth in claim 11, wherein said predetermined condition includes carbon concentration versus chromium concentration in said molten iron bath to satisfy the following formula:

$$[C] \geq 4.03 + 0.84 \times [Cr]$$

13. A process as set forth in claim 11, wherein said first stage is separated into two series steps, in which a first scrap melting step is performed in advance of a second heating step, for melting said scrap and said second heating step is performed subsequent to said first scrap melting step for rising the temperature of said molten iron bath to a temperature higher than or equal to 1500° C. and adjusting carbon concentration [C] versus chromium concentration [Cr] to satisfy the following formula:

$$[C] \geq 4.03 + 0.84 \times [Cr]$$

14. A process as set forth in claim 13, which further comprises a step of monitoring a condition of molten iron bath and detecting a timing for transition between said first scrap melting step and said heating step on the basis of the monitored condition.

15. A process as set forth in claim 14, wherein said molten iron bath condition monitoring step is performed by monitoring variation of molten iron temperature for detecting said transition timing when variation rate of said molten iron temperature becomes constant.

16. A process as set forth in claim 14, wherein said chromium containing iron scarp is selected to contain a known concentration of nickel and said molten iron bath condition monitoring step is performed by monitoring nickel concentration in said molten iron for detecting said transition timing when the monitored nickel concentration reaches a predetermined value which is arithmetically derived on the basis of said known concentration of nickel in said chromium containing iron scrap, initial concentration of nickel in said molten pig iron and amount of said chromium containing iron scrap charged in said converter.

17. A process as set forth in claim 10, wherein said second stage includes a step for finishing reduction for promoting reduction by stirring the molten iron bath.

* * * * *

UNITED STATES PATENT AND TRADEMARK OFFICE
CERTIFICATE OF CORRECTION

PATENT NO. : 4,919,713

DATED : April 24, 1990

INVENTOR(S) : Sumio Yamada, Chikashi Tada, Keizo Taoka, Hajime Bada

It is certified that error appears in the above-identified patent and that said Letters Patent is hereby corrected as shown below:

Column 6, line 12 and 13, change "C→CO 12X0.8/11.2X245 (kcal/kgC) =2100 $(kcal/Nm^3 \, O_2)$" to --C → CO 12  0.8/11.2 x 245 (kcal/kgC) = 2100 $(kcal/Nm^3 \, O_2)$--

Signed and Sealed this

Sixth Day of August, 1991

*Attest:*

HARRY F. MANBECK, JR.

*Attesting Officer*     *Commissioner of Patents and Trademarks*

UNITED STATES PATENT AND TRADEMARK OFFICE
CERTIFICATE OF CORRECTION

PATENT NO. : 4,919,713
DATED : April 24, 1990
INVENTOR(S) : Sumio Yamada

Figure 2:
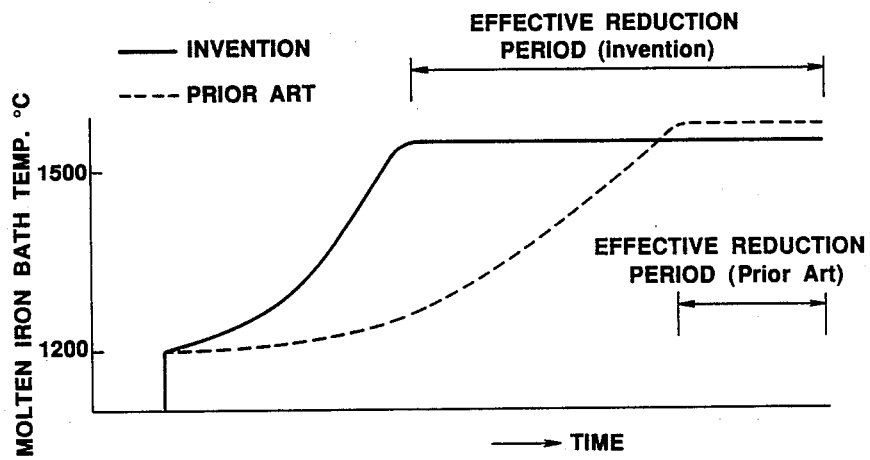
FIG. 2 is a graph showing relationship between reduction period and temperature of a molten iron bath in the prior art and the invention.

It is certified that error appears in the above-indentified patent and that said Letters Patent is hereby corrected as shown below:

In the drawings, delete Sheet 1 consisting of Figs. 1 and 2, to be replaced with the corrected drawings sheet consisting of Figs. 1 and 2, as shown on the attached page.

Signed and Sealed this

Fifteenth Day of March, 1994

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 4,919,713
DATED : April 24, 1990
INVENTOR(S) : Sumio Yamada

It is certified that error appears in the above-indentified patent and that said Letters Patent is hereby corrected as shown below:

Column 2, lines 23 and 36, "0.84" should read --0.084--.

Column 6, line 1, "Co" should read --CO--.

Column 6, line 12, "245" should read --2450--.

Column 6, line 31, "input heat becomes 2828.8" should read --heat generated becomes 2824.8--.

Column 10, Table IV, under subheading "Cr", "2.73" should read --15.58--. Under subheading "Ni", please insert --2.73--.

Column 12, line 41, "0.84" should read --0.084--.

Column 12, line 48, "0.84" should read --0.084--.

Column 12, line 60, "0.84" should read --0.084--.

Column 14, line 4, "0.84" should read --0.084--.

Column 14, line 17, "0.84" should read --0.084--.